United States Patent
Adegawa

(10) Patent No.: US 8,857,069 B2
(45) Date of Patent: Oct. 14, 2014

(54) TILT DETECTING DEVICE AND LASER SURVEYING INSTRUMENT

(75) Inventor: Toshikazu Adegawa, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 264 days.

(21) Appl. No.: 13/510,297

(22) PCT Filed: Jan. 17, 2011

(86) PCT No.: PCT/JP2011/051141
§ 371 (c)(1),
(2), (4) Date: May 17, 2012

(87) PCT Pub. No.: WO2011/090177
PCT Pub. Date: Jul. 28, 2011

(65) Prior Publication Data
US 2012/0216413 A1    Aug. 30, 2012

(30) Foreign Application Priority Data
Jan. 22, 2010 (JP) .................................. 2010-11928

(51) Int. Cl.
*G01C 9/00* (2006.01)
*G01C 15/00* (2006.01)

(52) U.S. Cl.
CPC ................ *G01C 9/00* (2013.01); *G01C 15/008* (2013.01); *G01C 15/004* (2013.01)
USPC ......................................................... 33/291

(58) Field of Classification Search
CPC ........... G01C 15/008; G01C 9/00; G01C 9/06
USPC ............................................... 33/291, 366.11
See application file for complete search history.

(56) References Cited

U.S. PATENT DOCUMENTS

| 4,182,046 | A | * | 1/1980 | Ludlow et al. | ............. 33/366.16 |
| 5,136,784 | A | * | 8/1992 | Marantz | ..................... 33/366.24 |

(Continued)

FOREIGN PATENT DOCUMENTS

| JP | 61-89511 A | 5/1986 |
| JP | 6-26861 A | 2/1994 |
| JP | 8-285596 A | 11/1996 |
| JP | 2001-280964 A | 10/2001 |
| JP | 2006-78178 A | 3/2006 |
| JP | 2006-308592 A | 11/2006 |
| JP | 2007-132716 A | 5/2007 |

OTHER PUBLICATIONS

International Preliminary Report on Patentability mailed Aug. 9, 2012 in corresponding PCT application No. PCT/JP2011/051141.
International Search Report mailed Apr. 12, 2011 in corresponding PCT application No. PCT/JP2011/051141.

*Primary Examiner* — Christopher Fulton
(74) *Attorney, Agent, or Firm* — Nields, Lemack & Frame, LLC

(57) ABSTRACT

The present invention provides a tilt detecting device (1), comprising a first tilt sensor (2) for detecting a tilting with respect to direction of gravity with high accuracy, a second tilt sensor (3) for detecting the tilting with respect to direction of gravity and for detecting the tilting with lower accuracy than that of the first tilt sensor and in a range wider than that of the first tilt sensor, wherein the first tilt sensor and the second tilt sensor are fixed relatively to each other, and the tilting is detected by the second tilt sensor by using a reference position and a detecting direction as detected by the first tilt sensor as reference.

9 Claims, 8 Drawing Sheets

(56) References Cited

U.S. PATENT DOCUMENTS

| | | |
|---|---|---|
| 5,313,713 A * | 5/1994 | Heger et al. ............ 33/366.14 |
| 5,479,715 A * | 1/1996 | Schultheis et al. ........ 33/366.16 |
| 6,011,613 A * | 1/2000 | Ohtomo et al. ............ 356/4.08 |
| 6,248,989 B1 | 6/2001 | Ohishi |
| 6,493,067 B1 | 12/2002 | Kodaira et al. |
| 6,675,489 B2 * | 1/2004 | Ohtomo et al. ............ 33/290 |
| 7,433,028 B2 | 10/2008 | Kumagai et al. |
| 2006/0242850 A1 * | 11/2006 | Ammann et al. ............ 33/290 |

\* cited by examiner

TILT DETECTING DEVICE AND LASER SURVEYING INSTRUMENT

TECHNICAL FIELD

The present invention relates to a tilt detecting device, which can detect horizontality with high accuracy and also can detect an arbitrary angle as desired. The invention also relates to a laser surveying instrument, which can project a laser beam by rotary irradiation to form a horizontal plane or a tilted plane as desired.

BACKGROUND ART

A laser surveying instrument is used to project a laser beam by rotary irradiation and to form a reference line or a reference plane necessary for construction work and civil engineering work. For the purpose of forming a horizontal reference plane and setting a tilted reference plane, the laser surveying instrument has a tilt detecting device.

In the past, laser surveying instruments have been known, which can form a horizontal reference plane and can form a reference plane with a desired tilt angle as disclosed in the Patent Publication JP-A-2007-132716 (the Patent Document 1) and in the Patent Publication JP-A-2006-308592 (the Patent Document 2).

The tilt detecting device as disclosed in the Patent Document 1 is a combination of a tilt sensor for detecting horizontality with high accuracy and an encoder for detecting a tilt angle from a reference position. The tilt sensor detects horizontality, and the encoder detects an angle from the horizontality with high accuracy. The tilt sensor detects horizontality with high accuracy and the encoder detects an angle from the horizontality as set by the tilt sensor, and an arbitrary tilt angle from the horizontality can be detected.

The tilt detecting device as disclosed in the Patent Document 2 is a combination of a tilt sensor for detecting the horizontality with high accuracy and a gravity sensor for detecting a tilt angle with respect to the gravitational field. The horizontality is accurately detected by the tilt sensor, and tilt angle is directly detected by the gravity sensor.

By the tilt detecting device as disclosed in the Patent Document 1, an angle can be detected with high accuracy by the encoder. Thus, by the laser surveying instrument disclosed in the Patent Document 1, a horizontal reference plane and a tilted reference plane can be set with high accuracy.

However, in the tilt detecting device disclosed in the Patent Document 1, there are problems that the mechanism of the encoder is complicated and that higher cost is required. In the tilt detecting device as disclosed in the Patent Document 2, the horizontality can be detected with high accuracy, but the tilt angle is detected by using the gravity sensor, and the gravity sensor has lower resolution (lower detection accuracy). For this reason, the tilt detecting device according to the Patent Document 2 has simple structure, but there is a problem in that the detection accuracy to detect the tilt angle is low.

To overcome the above problems, it is an object of the present invention to provide a tilt detecting device, which has simple structure and can be produced at lower cost, and which can detect the tilt angle with higher accuracy. Also, the invention provides a laser surveying instrument produced at lower cost, which can set a horizontal reference plane or a tilted reference plane with high accuracy by adopting the tilt detecting device as described above in the laser surveying instrument.

PRIOR ART REFERENCES

[Patent Document 1] JP-A-2007-132716 Patent Publication
[Patent Document 2] JP-A-2006-308592 Patent Publication

DISCLOSURE OF THE INVENTION

The present invention provides a tilt detecting device, comprising a first tilt sensor for detecting a tilting with respect to direction of gravity with high accuracy, a second tilt sensor for detecting the tilting with respect to direction of gravity and for detecting the tilting with lower accuracy than that of the first tilt sensor and in a range wider than that of the first tilt sensor, wherein the first tilt sensor and the second tilt sensor are fixed relatively to each other, and the tilting is detected by the second tilt sensor by using a reference position and a detecting direction as detected by the first tilt sensor as reference Also, the invention provides the tilt detecting device as described above, wherein the second tilt sensor can be set in a plurality of small detection ranges where detection ranges of tilting are partially superimposed on or continuous to each other, and among the plurality of small detection ranges, a reference of a first small detection range is set by the first tilt sensor, and a reference of the second small detection range is a predetermined value obtained in the first small detection range superimposed on or continuous to the second small detection range. Further, the invention provides the tilt detecting device as described above, further comprising a third small detection range, and a reference in the third small detection range is a result of the detection detected in the second small detection range. Also, the invention provides the tilt detecting device as described above, wherein the second tilt sensor can be set in a larger detection range, including all of tilt angle ranges detectable by the second tilt sensor, and a smaller detection range, which is a part of the larger detection range, and resolution of the smaller detection range is set to resolution higher than that of the larger detection range, and tilt detection in the smaller detection range is carried out based on the result of detection detected in the larger detection range as reference. Further, the invention provides the tilt detecting device as described above, comprising a plurality of the first tilt sensors, the plurality of first tilt sensors are installed with tilting different from each other, and the second tilt sensor detects the tilting based on the reference position detected by one of the first tilt sensors. Also, the invention provides the tilt detecting device as described above, wherein the second tilt sensor comprises a tilt displacement sensor, an amplifier for amplifying a detection signal from the tilt displacement sensor, a reference setter for setting a reference position on the amplifier, and a gain setter for setting gain of the amplifier, and wherein the reference can be offset according to the detected tilt angle, and a dynamic range of the amplifier is matched to the preset smaller detection range. Further, the invention provides the tilt detecting device as described above, wherein the first tilt sensor is a tilt sensor, and the second tilt sensor is an acceleration sensor.

The present invention relates to a laser surveying instrument, comprising a laser beam projector having a light source for emitting a laser beam and a rotator for projecting the laser beam in rotary irradiation, a drive unit for tilting the laser beam projector, and a tilt detecting device for detecting tilting of the laser beam projector, wherein the tilt detecting device has a first tilt sensor for detecting the tilting with respect to direction of gravity with high accuracy and a second tilt sensor being fixed relatively with the first tilt sensor, for detecting the tilting with respect to direction of gravity and for detecting the tilting in a range wider than that of the first tilt sensor at an accuracy lower than that of the first tilt sensor, and the tilting is detected by the second tilt sensor based on a reference position and the detection direction detected by the first tilt sensor as reference, and the tilting is set by the drive unit.

Also, the invention provides the laser surveying instrument as described above, wherein the tilt detecting device is tiltably mounted with respect to the laser beam projector, the detecting device is set to a predetermined tilting based on the result of detection by the second tilt sensor from a condition where the first tilt sensor detects the horizontality, and the laser beam projector is tilted so that the first tilt sensor detects the horizontality by the driving unit, and the tilting is set.

Further, the invention provides the laser surveying instrument as described above, wherein the first tilt sensor and the second tilt sensor are installed on the laser beam projector, and the first tilt sensor and the second tilt sensor are fixed relatively to each other via the laser beam projector, and the laser beam projector is tilted based on the result of detection of the second tilt sensor from the condition where the first tilt sensor detects horizontality, and the tilting is set.

BRIEF DESCRIPTION OF THE DRAWINGS

FIG. 10 (A) shows a condition of tilt angle setting, and FIG. 10 (B) shows a condition of tilted reference plane setting.

LEGEND OF REFERENCES NUMERALS

Figure 1:
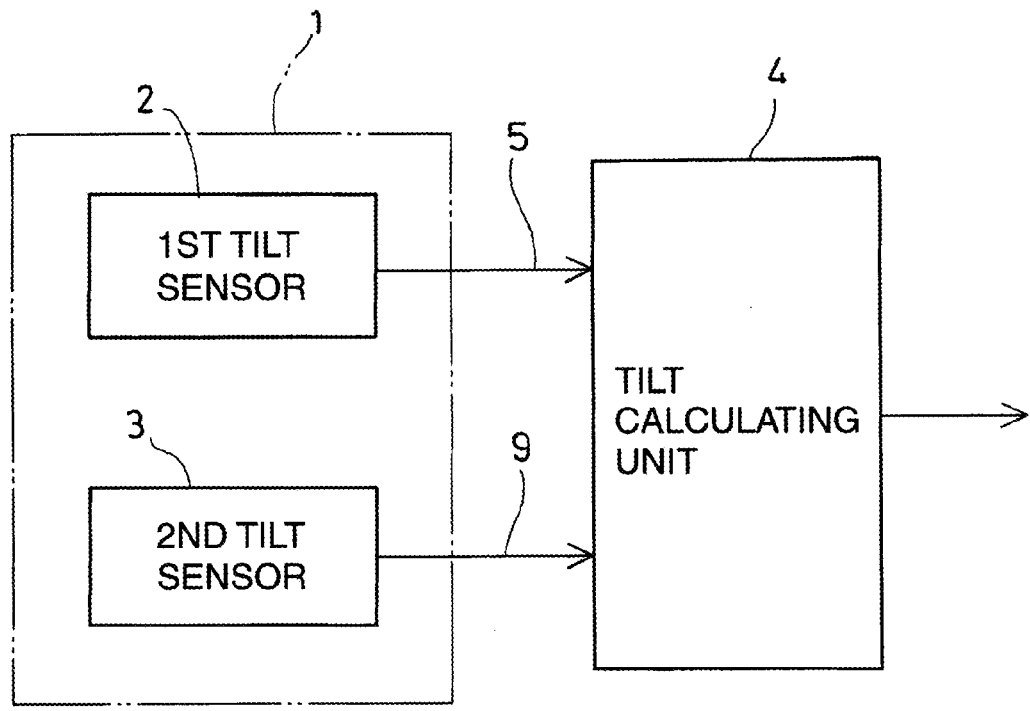
FIG. 1 is a schematical block diagram to show a tilt detecting device according to an embodiment of the present invention.

1 Tilt detecting device
2 1st tilt sensor
3 2nd tilt sensor
4 Tilt calculating unit
11 Laser beam projector
12 Rotator
14 Laser beam
26 X-axis leveling motor
31 Y-axis leveling motor
33 X-axis tilt sensor
39 X-axis tilt setting motor
41 Y-axis tilt sensor
47 Y-axis tilt setting motor
48 X-axis tilt angle detector
49 Y-axis tilt angle detector
51 Control system
52 Control arithmetic unit
53 Leveling unit
54 Tilt setting unit
56 X-axis drive control unit
57 Y-axis drive control unit
58 X-axis tilt setting control unit
59 Y-axis tilt setting control unit
61 Temperature sensor
62 Timer

BEST MODE FOR CARRYING OUT THE INVENTION

Description will be given below on embodiment of the present invention by referring to the attached drawings.

FIG. 1 shows general outline of a tilt detecting device according to an embodiment of the present invention. In FIG. 1, reference numeral 1 denotes a tilt detecting device, numeral 2 represents a first tilt sensor, which detects tilting with respect to direction of gravity, and which has high resolution to detect a reference position, for instance, horizontality or verticality with high accuracy. The first tilt sensor 2 is a photoelectric tilt sensor, for instance.

Reference numeral 3 denotes a second tilt sensor for gradient setting. The second tilt sensor has a resolution lower than that of the first tilt sensor 2 and detects tilting in a range wider than the range of the first tilt sensor 2. For instance, the second tilt sensor 3 is an acceleration sensor to detect tilting to direction of gravity (i.e. tilting with respect to verticality, or tilting with respect to horizontality). In FIG. 1, reference numeral 4 denotes a tilt calculating unit for calculating horizontality or a tilt angle based on signals from the first tilt sensor 2 and the second tilt sensor 3, and for outputting the result of calculation as a tilt angle signal.

The first tilt sensor 2 and the second tilt sensor 3 are integrated together or these may be installed separately on an object to be inspected where tilting is to be detected. In case the first tilt sensor 2 and the second tilt sensor 3 are installed separately from each other, the first tilt sensor 2 and the second tilt sensor 3 are mounted under a condition relatively fixed to each other so that the first tilt sensor 2 and the second tilt sensor 3 are tilted in integrated manner.

A tilting direction to be detected by the first tilt sensor 2 is consistent with a tilting direction to be detected by the second tilt sensor 3. The second tilt sensor 3 detects tilting in a direction to be detected by the first tilt sensor 2 and also detects tilting beyond a tilting range to be detected by the first tilt sensor 2, using the horizontality detected by the first tilt sensor 2 as reference.

The first tilt sensor 2 detects the horizontality with high accuracy, and also detects tilt angle within the range of ±4' around the horizontality, and outputs the tilt angle as a first tilt detecting signal 5. Detection accuracy of the first tilt sensor 2 is ±1", for instance. The second tilt sensor 3 detects a tilt angle within the range of ±30° around the verticality. Detection accuracy of the second tilt sensor 3 is ±1', for instance.

Figure 2:
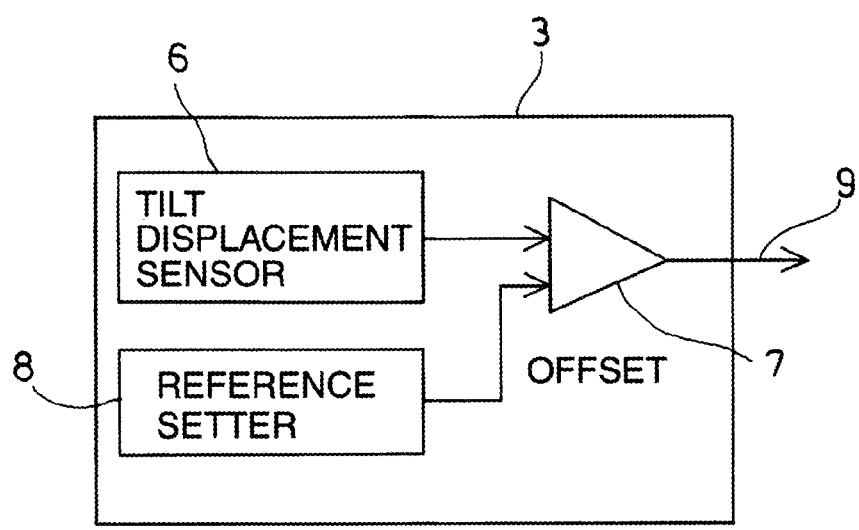
FIG. 2 is a schematical block diagram of a second tilt sensor to be used in the tilt detecting device.

Further, the second tilt sensor 3 is shown in FIG. 2.

The second tilt sensor 3 has a tilt displacement sensor 6 to sense and detect tilt displacement with respect to the direction of gravity, an amplifier 7 for amplifying a signal from the tilt displacement sensor 6, and a reference setter 8 for setting reference voltage at the amplifier 7. The tilt displacement sensor 6 is an acceleration sensor, for instance, and the displacement sensor 6 detects tilt displacement with respect to the direction of gravity, i.e. to vertical line, and issues a signal to correspond to the tilt displacement. A micro-computer is used as the reference setter 8, for instance. At an arbitrary tilt angle as detected by the tilt displacement sensor 6, reference (i.e. reference position) is offset so that output from the amplifier 7 will be 0 V. The output from the amplifier 7 is inputted to the tilt calculating unit 4 as a second tilt detecting signal 9. Based on the second tilt detecting signal 9, a tilt angle is calculated by the tilt calculating unit 4.

Next, referring FIG. 3, description will be given on operation of tilt detection by the tilt detecting device 1 according to the first embodiment.

In the first embodiment, a reference voltage (offset voltage) to be applied to the amplifier 7 is set so that output voltage from the amplifier 7 at every predetermined angle is to be 0 V every time an angle detected by the tilt displacement sensor 6 is beyond the predetermined angle.

Figure 3:
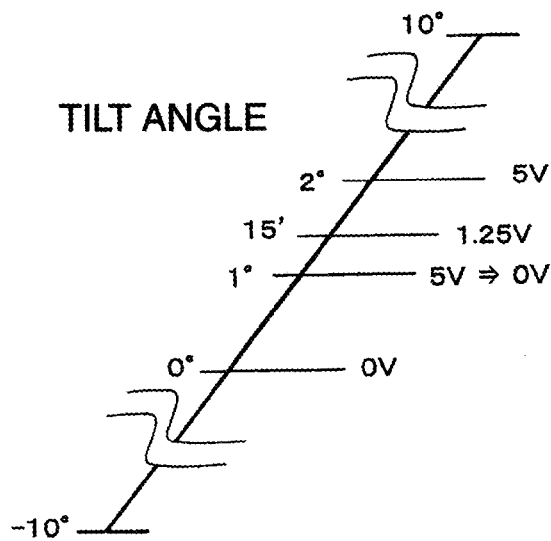
FIG. 3 is a drawing to explain resolution of the second tilt sensor.

For instance, as shown in FIG. 3, it is assumed that the tilt displacement sensor 6 detects the tilting in the range of −10° to +10°, and that output voltage of the amplifier 7 is 5 V at maximum (i.e. dynamic range is 5 V at maximum). Each time the second tilt sensor 3 detects 1°, the reference setter 8 sets the reference voltage to be applied to the amplifier 7 so that the output voltage from the amplifier 7 will be 0 V.

For instance, when an angle of 1° 15' is to be detected, the reference voltage to be applied to the amplifier 7 is set so that output voltage from the amplifier 7 will be 0 V at a position where the first tilt sensor 2 detects the horizontality.

When the tilt detecting device 1 is tilted and a detection angle of the tilt displacement sensor 6 reaches 1°, the output of the amplifier 7 will be 5 V. At the moment when detection angle of the tilt displacement sensor 6 is turned to 1°, the reference voltage to applied to the amplifier 7 is set again by the reference setter 8 so that the output from the amplifier 7 will be 0 V. The tilt displacement sensor 6 is tilted further, and at the moment when a detection signal to correspond to 15' is outputted, the detection angle will be 1° 15'.

Here, in case where angle displacement of 1° is regarded as 5 V:

$$1° \times 3600'' \div 5000 \text{ mV} = 0.72''/\text{mV}.$$

This means that the resolution is of sufficient value.

As described above, in the first embodiment, at each angle required, i.e. each time the angle exceeds 1°, the next 1° is divided finely and detected. This finer dividing is set in such manner that a part of the range of finer dividing will be superimposed on each other. For instance, in case the detection range is 1°, the range of the finer dividing should be set to 1° 1'.

By dividing finely, even when linearity is not found on temperature coefficient, it is advantageous in that finer amendment can be made.

In case an angle is set by the tilt detecting device 1, e.g. in case the angle is set to 3° 30', offset is made so that the tilt detecting device 1 is tilted and each time the tilt detecting device 1 is tilted by 1°, the output from the second tilt detection signal 9 will be 0. Every time the offset is made, the tilt calculating unit 4 calculates an angle where an angle of 1° is added. A position where the added angle will be 3° and, further, a position where an angle of 30' is detected will be the angle to be set. Therefore, the detection range is continuous to the value to be offset, and the value of 0 as offset will be the reference for the next detection range.

Next, referring to FIG. 1, FIG. 2, FIG. 4 and FIG. 5, description will be given on the second embodiment. General outline of the arrangement is the same as that of the first embodiment.

In the second embodiment, a gain setter 10 is provided. The gain to be applied to the amplifier 7 is set to two values by the gain setter 10. In one of the two values of gain, similarly to the first embodiment, a predetermined angle after changing is set to 0 V with respect to the change of the predetermined angle from a predetermined angle (the range of finer dividing), and the gain (hereinafter, referred as "gain for finer detection") is applied so that a voltage of 5 V is outputted from the amplifier 7 at an angular change of 1°, for instance, from the predetermined angle. In another case, the gain (hereinafter, referred as "gain for coarse detection") is applied so that a voltage of 5 V is outputted to the angular range detectable by the tilt displacement sensor 6, i.e. in full scale (coarse detection range).

In the second embodiment, the gain for coarse detection and the gain for finer detection are selectively applied to the amplifier 7. As a result, the tilt angle can be detected at high speed and with high accuracy.

Figure 4:
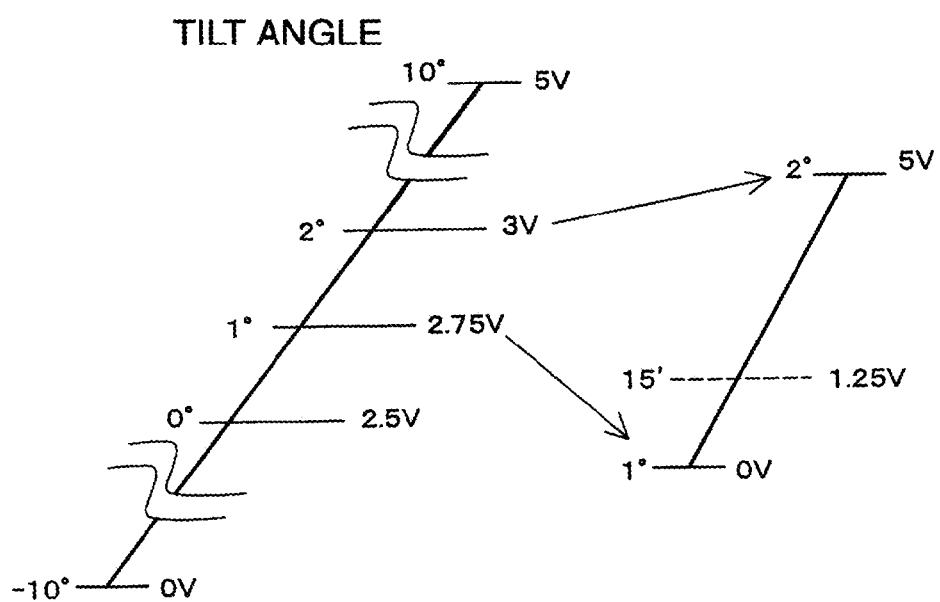
FIG. 4 is a drawing to show resolution of the second tilt sensor in a second embodiment.
Figure 5:
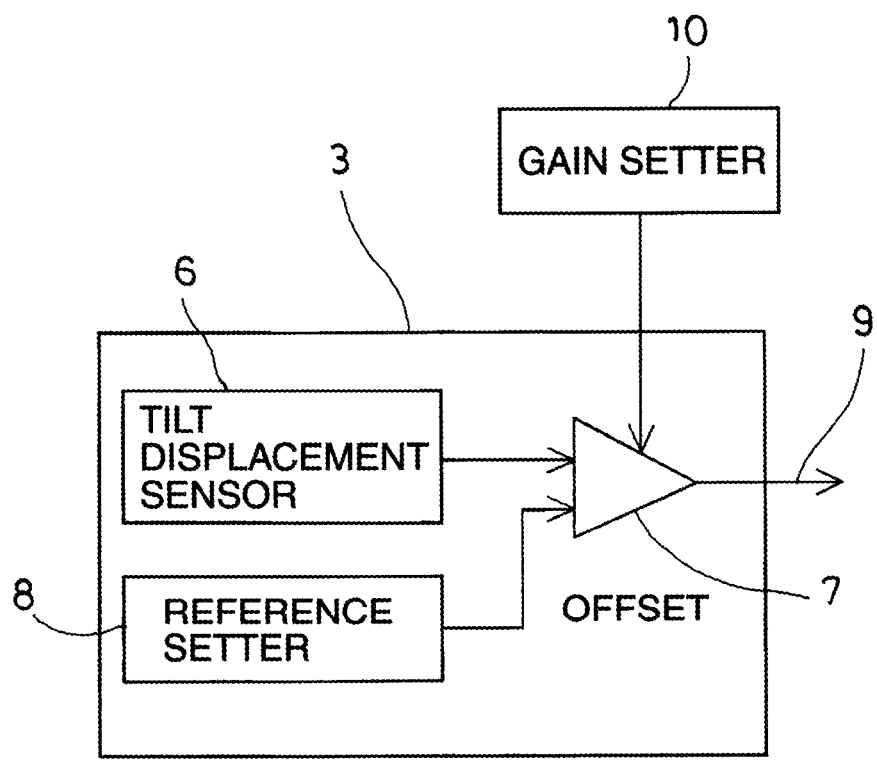
FIG. 5 is a schematical block diagram of the second tilt sensor of the second embodiment.

Now, referring to FIG. 4 and FIG. 5, description will be given on operation of the second embodiment.

First, the gain for coarse detection is applied on the amplifier 7 by the gain setter 10. When the gain for coarse detection is applied, output voltage from the amplifier 7 will be in the range of 0 V to 5 V in full scale (i.e. the range of −10° to +10°). The reference voltage to be applied to the amplifier 7 is set by the reference setter 8 so that the output voltage from the amplifier 7 at a position where the horizontality is detected by the first tilt sensor 2 will be 2.5 V. By this procedure, the reference position is offset.

For instance, when a tilt angle of 1° 15' with respect to the horizontality is to be detected, an angle of 1° is detected under a condition of the gain for coarse detection, and at a moment an angle 1° is detected (i.e. when the output voltage is 2.75 V), re-setting is made by the reference setter 8 so that the reference voltage will be 0 V. Then, the gain for finer detection is applied to the amplifier 7 by the gain setter 10. When the gain for finer detection is applied, the output voltage from the amplifier 7 will be set so that the output voltage will be 5 V at an angular change of 1° of the tilt displacement sensor 6. When the tilt detecting device 1 tilts further from a position where the detected angle is 1° and a position where the detected angle is 15' will be a position where an angle of 1° 15' is to be detected.

When this angle of 15' is detected, the resolution of the tilt displacement sensor 6 is 0.72"/mV as described above, and the detection with high accuracy can be accomplished.

That is, in the second embodiment, the detection range can be set to the range for coarse detection and to the range for finer dividing. Using the reference position detected by the first tilt sensor 2, e.g. the horizontal position, as reference, the second tilt sensor 3 detects a coarse tilt angle (i.e. rough tilt angle) in the coarse detection range mode. In the finer dividing range mode, a tilt angle in the finer dividing range is detected by using the coarse tilt angle detected as reference.

Next, when angle setting is made by using the tilt detecting device in the second embodiment, e.g. in case setting is made to 3° 30', the detection of tilting of 3° is made in the condition of the gain for coarse detection, and the detection of tilting of 30', which is smaller than or equal to 1°, is accomplished by changing over to the gain for finer detection.

Therefore, up to the tilting of 3°, the setting can be made at higher speed. In the tilt detection of 30' where the accuracy is required, the setting can be made at lower speed. As a result, angle setting can be made more quickly by maintaining high accuracy.

Figure 6:
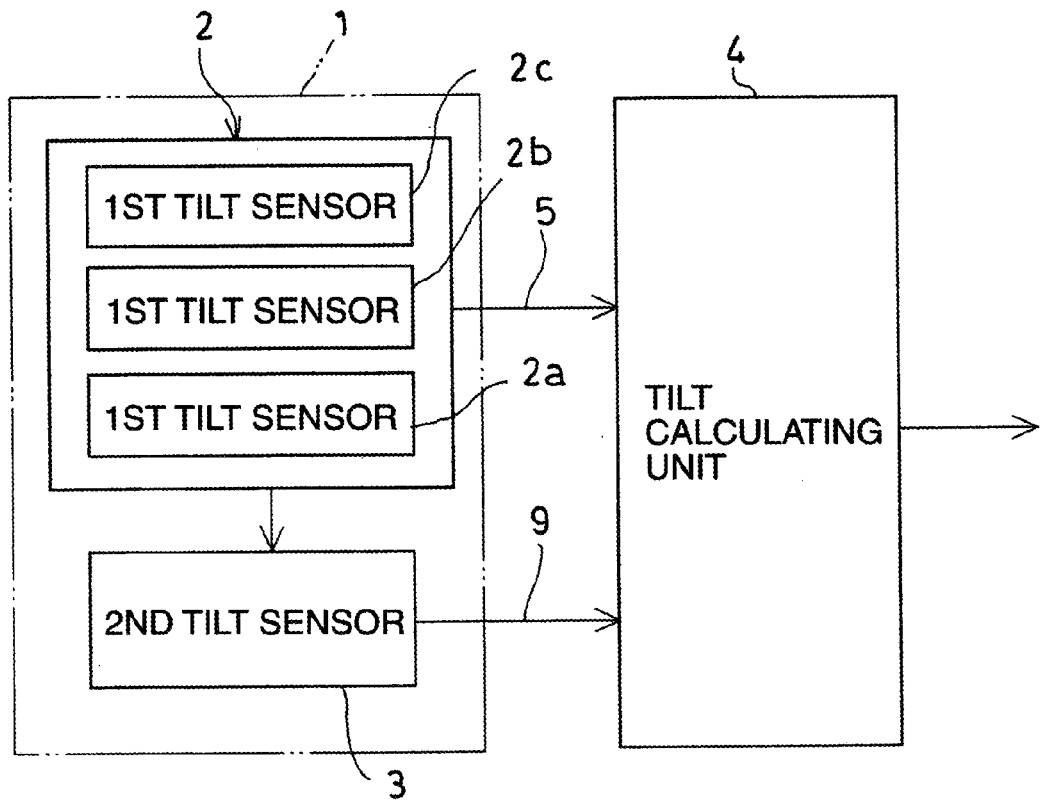
FIG. 6 is a block diagram of a tilt detecting device according to a third embodiment.

FIG. 6 shows a third embodiment. In FIG. 6, the same component as shown in FIG. 1 is referred by the same symbol, and detailed description is not given here.

In the third embodiment, a plurality of the first tilt sensors 2 with high resolution are provided. In the figure, three tilt sensors are shown: a first tilt sensor 2a, a first tilt sensor 2b, and a first tilt sensor 2c.

When it is supposed that the tilt displacement sensor 6 is in full scale (i.e. in the range of −10° to +10°), a first tilt sensor 2b is installed so that the first tilt sensor 2b can detect the horizontality, and another first tilt sensor 2a is installed in a condition where the first tilt sensor 2a is tilted at an angle of −5° when the first tilt sensor 2b detects the horizontality, and the other first tilt sensor 2c is installed in a condition where the first tilt sensor 2c is tilted at an angle of +5° and where the first tilt sensor 2b detects the horizontality.

That is, the first tilt sensors 2a, 2b and 2c are installed at an equal angular distance of 5° from each other. Also, the gain to be applied by the gain setter 10 is set so that the gain will be 5 V by angular change of 5° of the tilt displacement sensor 6.

Figure 7:
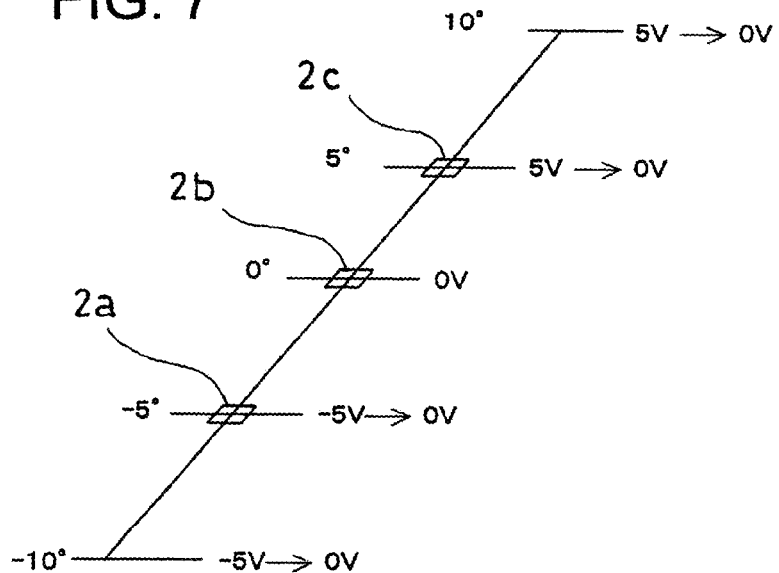
FIG. 7 is a drawing to show resolution of the second tilt sensor in the third embodiment.

Referring to FIG. 7, description will be given below on operation of the third embodiment.

The horizontal condition is detected by the first tilt sensor 2b with high accuracy. For instance, the tilting from 0° to 5° is detected based on the second tilt detecting signal 9 from the second tilt sensor 3. In this case, the gain is set so that a change of 5 V occurs on the amplifier 7 to the angular change of 5°, and the resolution of the tilt displacement sensor 6 is increased by four times in comparison with the resolution in case of one tilt displacement sensor 6.

When the tilt angle reaches 5°, the tilt angle 5° is detected with high accuracy by the first tilt sensor 2c. The detection signal of the first tilt sensor 2c is outputted to the tilt calculating unit 4, and the detection signal of the first tilt sensor 2c is also outputted to the second tilt sensor 3.

The detection signal from the first tilt sensor 2c is inputted to the second tilt sensor 3. Thereby the reference setter 8 and the gain setter 10 offset the reference voltage of the amplifier 7 so that the output voltage of the amplifier 7 will be 0 V at a tilt angle 5°, and the gain is set so that the angular change of 5° between the tilt angle 5° and the tilt angle 10° will be the output of 5 V of the amplifier 7.

Therefore, the tilt displacement sensor 6 detects the change of tilting from the tilt angle 5° and outputs the change to the tilt calculating unit 4. The tilt calculating unit 4 adds and when the change of angle detected by the tilt displacement sensor 6 to the tilt angle 5° as detected by the first tilt sensor 2c, and calculates the tilt angle.

In the third embodiment, the first tilt sensors 2 with high accuracy are adapted to be installed each at predetermined angle, and the angular range divided by the first tilt sensors 2 is adapted to be detected by the tilt displacement sensor 6. Therefore, the detection accuracy of the tilt displacement sensor 6 is increased by the number of dividing by the first tilt sensors 2. Every time the angle is detected by the first tilt sensors 2, errors of the tilt displacement sensor 6 are corrected. As a result, the accuracy of the whole tilt detecting device 1 is improved remarkably.

The first tilt sensors 2 may be installed in the number of two or four or more.

As described above, a tilt displacement sensor 6 of lower resolution and of lower cost, e.g. an acceleration sensor, is used, and the maximum output voltage (dynamic range) of the amplifier 7 is assigned to a part of the full scale of the tilt displacement sensor 6. As a result, the resolution of the tilt displacement sensor 6 is improved, and tilt detection with higher accuracy can be attained.

Next, referring to FIG. 8, description will be given on the first embodiment of the laser surveying instrument provided with the tilt detecting device 1 as described above.

Figure 8:
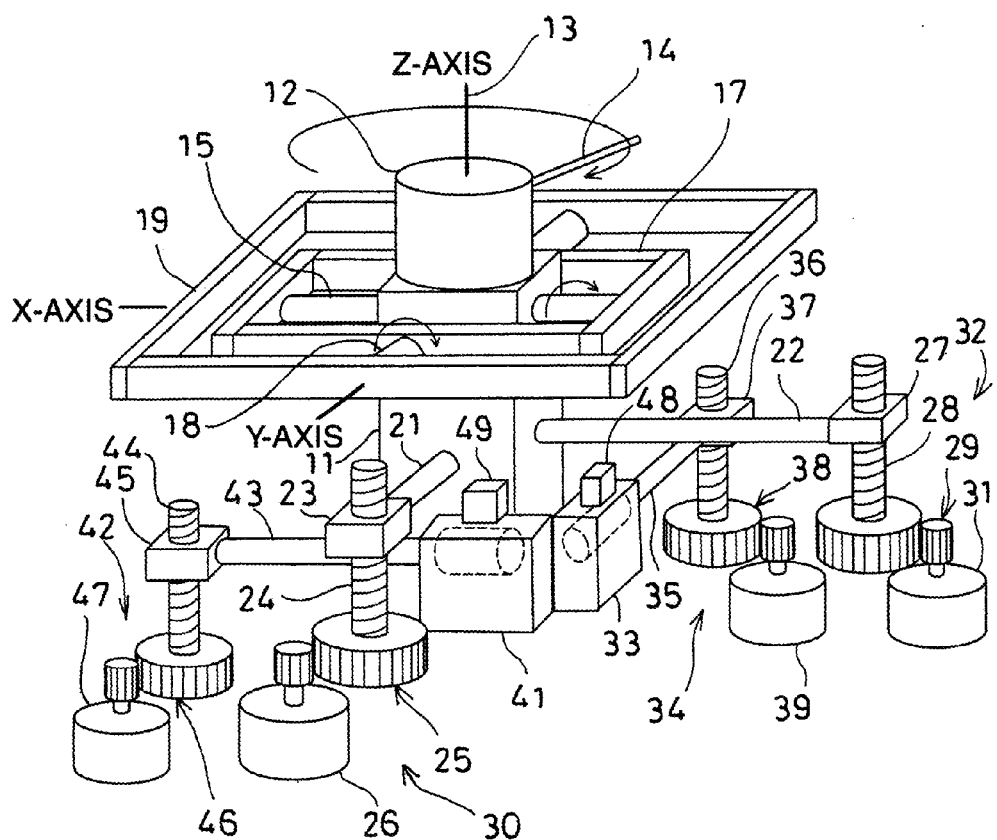
FIG. 8 is a perspective view of an essential portion of the first embodiment of a laser surveying instrument provided with the tilt detecting device according to the present invention.

FIG. 8 shows an essential portion of the laser surveying instrument. In FIG. 8, reference numeral 11 denotes a laser beam projector. The laser beam projector 11 comprises a light source such as a laser diode to emit a laser beam, and a projection light optical system for projecting a laser beam emitted from the light source. The laser beam projector 11 has a rotator 12 at an upper end. The rotator 12 is rotatably installed around a vertical axis (Z-axis) 13. The rotator 12 has a deflection optical member, e.g. a pentagonal prism. A laser beam 14 projected from the laser beam projector 11 is deflected in horizontal direction and is projected in rotary irradiation, and a reference plane is formed by the laser beam 14.

The laser beam projector 11 is rotatably mounted on a first support member 17 via a first support shaft (X-axis) 15. The first support member 17 is rotatably provided on a second support member 19 via a second support shaft (Y-axis) 18.

Therefore, the first support member 17 can be rotated around the second support shaft (Y-axis) 18, and the laser beam projector 11 can be rotated around the first support shaft (X-axis) 15, and the laser beam projector 11 can be tilted in two directions: in X-axis direction and in Y-axis direction. Here, the X-axis is extended in horizontal direction and perpendicularly crosses the Z-axis. The Y-axis is extended in horizontal direction and perpendicularly crosses the X-axis and the Z-axis.

On the laser beam projector 11, there are provided a first tilt driving lever 21 and a second tilt driving lever 22, which are extended in Y-axis direction and in X-axis direction respectively.

At a forward end of the first tilt driving lever 21, a first nut unit 23 is mounted, and the first nut unit 23 is screwed in a first screw rod 24. The first screw rod 24 is connected to an X-axis leveling motor 26 via a first gear train 25. On a forward end of the second tilt driving lever 22, a second nut unit 27 is mounted. The second nut unit 27 is screwed in a second screw rod 28, and the second screw rod 28 is connected to a Y-axis leveling motor 31 via a second gear train 29.

The first tilt driving lever 21, the first nut unit 23, the first screw rod 24, the first gear train 25, and the X-axis leveling motor 26 make up together an X-axis tilt driving unit 30. The second tilt driving lever 22, the second nut unit 27, the second screw rod 28, the second gear train 29, and the Y-axis leveling motor 31 make up together a Y-axis tilt driving unit 32.

As the X-axis leveling motor 26 and the Y-axis leveling motor 31, a motor with controllable rotating angle, e.g. pulse motor, servo motor, etc. may be used.

On a required portion of the laser beam projector 11, e.g. on a lower part, an X-axis tilt sensor 33, acting as the first tilt sensor, is mounted, and the X-axis tilt sensor 33 can be rotated around the centerline (not shown), which runs in parallel to the first support shaft (X-axis) 15. The X-axis tilt sensor 33 is a tilt sensor with high resolution, e.g. a photoelectric tilt sensor, and the X-axis photoelectric tilt sensor can detect the horizontality with high accuracy.

The X-axis tilt sensor 33 is relatively tilted with respect to the laser beam projector 11 by an X-axis tilt setting unit 34, and the X-axis tilt sensor 33 can be set to a predetermined tilt angle with respect to the vertical axis (Z-axis) 13 or to the horizontality.

The X-axis tilt setting unit 34 comprises a tilt setting lever 35 extended in horizontal direction from the X-axis tilt sensor 33, a nut 37 mounted on a forward end of the tilt setting lever 35 and screwed into a tilt setting screw 36, and an X-axis tilt setting motor 39, which is connected to the tilt setting screw 36 via a first tilt setting gear train 38.

Also, a Y-axis tilt sensor 41 as a first tilt sensor is provided on a required portion of the laser beam projector 11, e.g. on a lower portion and the Y-axis tilt sensor 41 can be rotated around a centerline (not shown), which runs in parallel to the second support shaft (Y-axis) 18. Similarly to the X-axis tilt sensor 33, the Y-axis tilt sensor 41 is a tilt sensor with high resolution, e.g. a photoelectric tilt sensor, and the Y-axis tilt sensor 41 can detect the horizontality with high accuracy.

The Y-axis tilt sensor 41 is relatively tilted to the laser beam projector 11 by a Y-axis tilt setting unit 42, and the Y-axis tilt sensor 41 can be set at a predetermined tilt angle with respect to the vertical axis (Z-axis) 13 or to the horizontality.

The Y-axis tilt setting unit 42 comprises a tilt setting lever 43 extended in horizontal direction from the Y-axis tilt sensor 41, a nut 45 mounted on a forward end of the tilt setting lever 43 and screwed into a tilt setting screw 44, and a Y-axis tilt setting motor 47, which is connected to the tilt setting screw 44 via a second tilt setting gear train 46.

An X-axis tilt angle detector 48, which serves as a second tilt sensor, is mounted on the X-axis tilt sensor 33 of the laser beam projector 11, and the X-axis tilt angle detector 48 is tilted integrally with the X-axis tilt sensor 33. The X-axis tilt angle detector 48 detects a tilt angle in rotating direction around the first support shaft (X-axis) 15.

A Y-axis tilt angle detector 49, which serves as a second tilt sensor, is mounted on the Y-axis tilt sensor 41 of the laser beam projector 11, and the Y-axis tilt angle detector 49 is tilted integrally with the Y-axis tilt sensor 41. The Y-axis tilt angle detector 49 detects a tilt angle in rotating direction around the second support shaft (Y-axis) 18.

The X-axis tilt angle detector 48 and the Y-axis tilt angle detector 49 can detect a tilt angle in wider range than a tilt angle of the X-axis tilt sensor 33 and the Y-axis tilt sensor 41 respectively, and these tilt angle detectors have lower detection accuracy (lower resolution) compared with the X-axis tilt sensor 33 and the Y-axis tilt sensor 41. As the X-axis tilt sensor 33 and the Y-axis tilt sensor 41, for instance, acceleration sensors to detect tilt angle in direction of gravity (i.e. in a vertical line) are used respectively.

Figure 9:
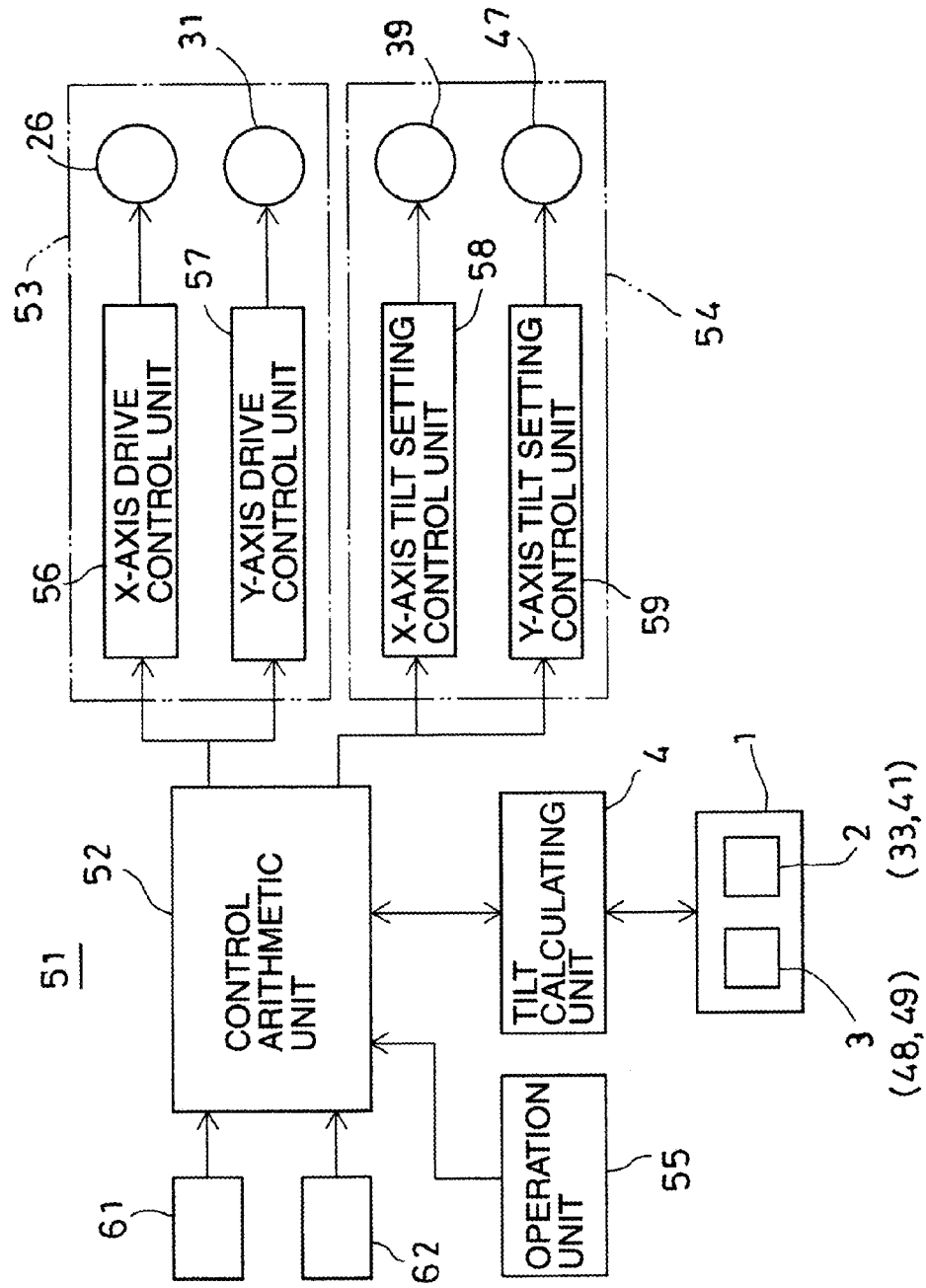
FIG. 9 is a schematical block diagram to show a control system of a laser surveying instrument according to the present invention.

Referring to FIG. 9, description will be given on general outline of the control system 51 of the laser surveying instrument.

In FIG. 9, the control system 51 comprises a control arithmetic unit 52, a leveling unit 53, a tilt setting unit 54, the tilt detecting device 1, the tilt calculating unit 4, and an operation unit 55 for setting and inputting tilting direction and tilt angle of a reference plane to be formed.

The leveling unit 53 has an X-axis drive control unit 56 and the X-axis leveling motor 26 to perform the leveling in rotating direction around the X-axis (the first support shaft 15), and the leveling unit 53 has a Y-axis drive control unit 57 and a Y-axis leveling motor 31 to perform the leveling in rotating direction around the Y-axis (the second support shaft 18).

The tilt setting unit 54 has an X-axis tilt setting control unit 58 and the X-axis tilt setting motor 39 for setting of tilting around X-axis (the first support shaft 15). The tilt setting unit 54 also has a Y-axis tilt setting control unit 59 and the Y-axis tilt setting motor 47 for setting the tilting around the Y-axis (the second support shaft 18).

The tilt detecting device 1 has the X-axis tilt sensor 33 and the Y-axis tilt sensor 41 as the first tilt sensors 2, and the tilt detecting device 1 also has the X-axis tilt angle detector 48 and the Y-axis tilt angle detector 49 as the second tilt sensors 3.

Based on the output from the first tilt sensors 2 (i.e. the X-axis tilt sensor 33 and the Y-axis tilt sensor 41) and on the output from the second tilt sensors 3 (i.e. the X-axis tilt angle detector 48 and the Y-axis tilt angle detector 49), the tilt calculating unit 4 calculates a tilting direction and a tilting angle and the tilt calculating unit 4 outputs the result of calculation to the control arithmetic unit 52.

First, description will be given on operation of the laser surveying instrument when a horizontal reference plane is formed by the laser beam 14.

When it is inputted from the operation unit 55 that the reference plane to be formed is horizontal, the Y-axis tilt driving unit 32 and the Y-axis tilt setting unit 42 are driven so that both the X-axis tilt sensor 33 and the Y-axis tilt sensor 41 detect the horizontality.

When the X-axis tilt sensor 33 and the Y-axis tilt sensor 41 detect the horizontality respectively, the centerline of the laser beam projector 11 runs in vertical direction, and the laser beam 14 projected from the rotator 12 runs in horizontal. The rotator 12 is rotated at a constant velocity, the laser beam 14 is projected in rotary irradiation within the horizontal plane, and a horizontal reference plane is formed.

Figure 10A:
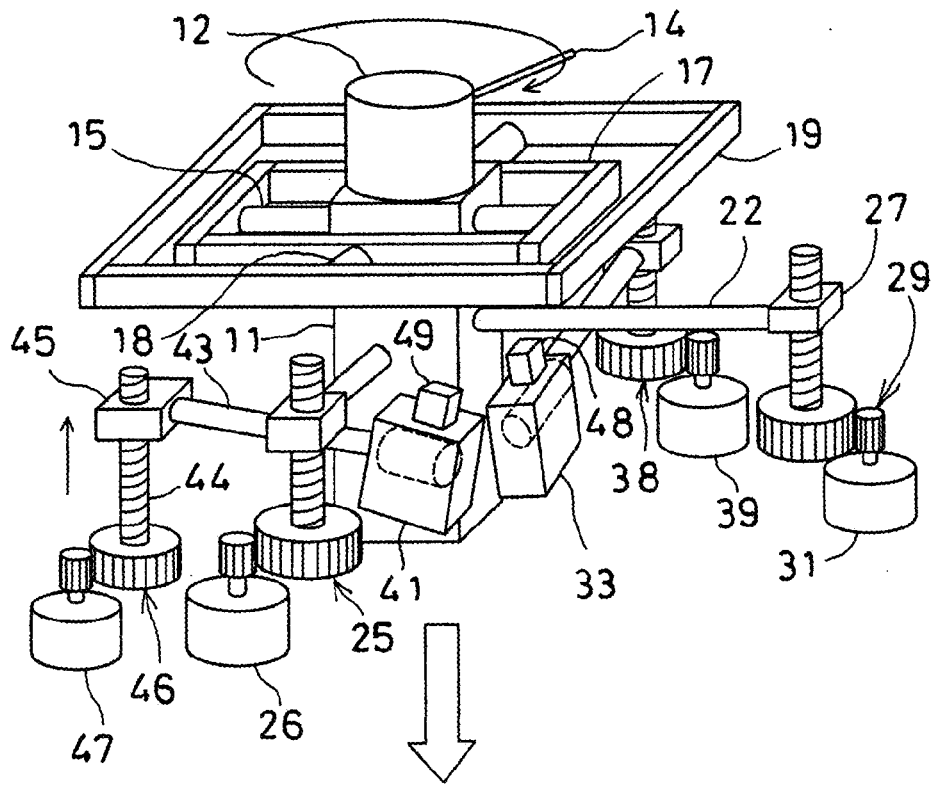
FIG. 10 (A) and FIG. 10 (B) are illustrative drawings to show operation of the laser surveying instrument.
Figure 10B:
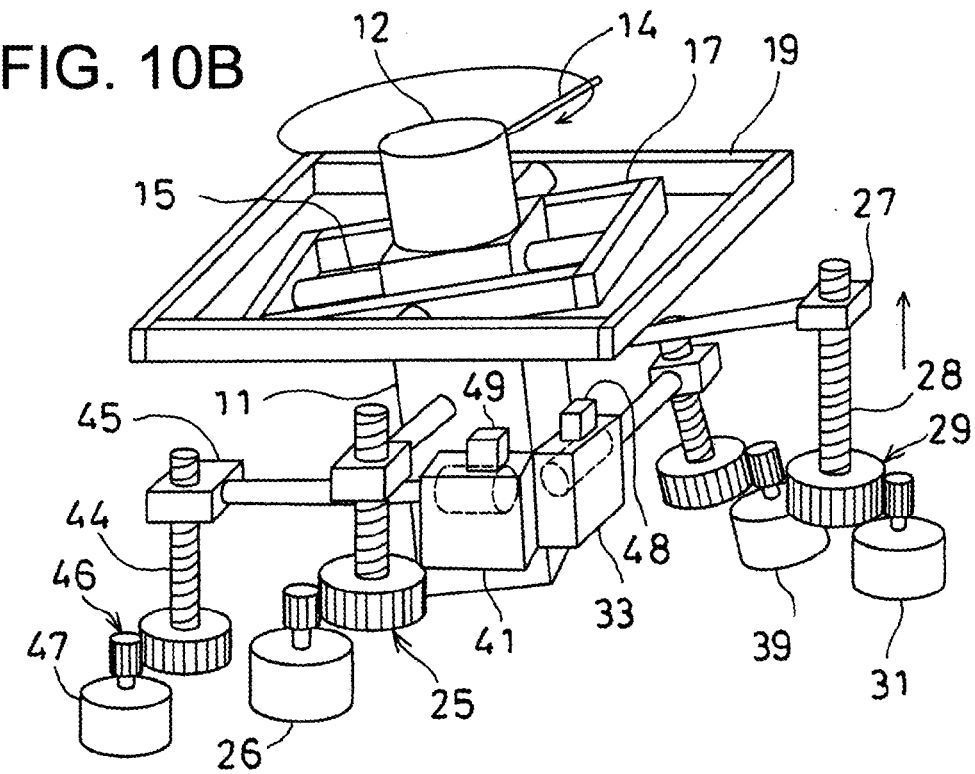

Next, by referring to FIG. 10, description will be given below on a case where a tilted reference plane is formed. In order to simplify the explanation, description will be given on tilt setting in rotating direction around the second support shaft 18.

Tilting direction of the reference plane to be formed (i.e. the setting as to whether it is in clockwise direction or in counterclockwise direction with respect to the second support shaft 18) and tilt angle are set from the operation unit 55, and the tilting direction and the tilt angle to be set are inputted to the control arithmetic unit 52. The control arithmetic unit 52 drives the Y-axis tilt setting motor 47 in a rotation amount consistent with the preset tilt angle via the Y-axis tilt setting control unit 59. When the Y-axis tilt setting motor 47 is a pulse motor, the pulse motor is driven by the number of pulses to correspond to the preset tilt angle.

By driving the Y-axis tilt setting motor 47, the Y-axis tilt sensor 41 is tilted, and the Y-axis tilt angle detector 49, which is integrated with the Y-axis tilt sensor 41, is also tilted. The tilting of the Y-axis tilt sensor 41 will be identical with the tilting of the Y-axis tilt angle detector 49.

In case the preset tilt angle exceeds the detection range of the Y-axis tilt sensor 41, the tilt angle is detected by the Y-axis tilt angle detector 49. It is judged at the control arithmetic unit 52 as to whether the tilt angle detected by the Y-axis tilt angle detector 49 is identical with the tilt angle as set and inputted. If the preset tilt angle is identical with the tilt angle as detected by the Y-axis tilt angle detector 49, tilt setting of the laser beam projector 11 is carried out.

The Y-axis leveling motor 31 is driven via the Y-axis drive control unit 57, and the laser beam projector 11 is tilted in the tilting direction as set so that the Y-axis tilt sensor 41 detects the horizontality.

The position of the laser beam projector 11 is determined when the horizontality is detected by the Y-axis tilt sensor 41, and the laser beam projector 11 is tilted in the tilting direction and at the tilt angle as set by the operation unit 55.

By rotating the rotator 12 by rotary irradiation while projecting the laser beam 14, a tilted reference plane can be formed.

With respect to the tilting in rotating direction around the first support shaft 15, setting can be made in similar manner by operating the X-axis tilt sensor 33, the X-axis tilt setting motor 39 and the X-axis leveling motor 26. By synthesizing the tilting relating to the second support shaft (Y-axis) 18 with the tilting relating to the first support shaft (X-axis) 15, the tilting of the reference plane can be set in an arbitrary direction and at an arbitrary angle.

A temperature sensor 61 (see FIG. 9) is provided at a position as required on the laser surveying instrument, and it may be arranged in such manner that the setting can be made on re-leveling and re-tilting reference plane when there is temperature change more than a certain predetermined value in the detection temperature compared with the temperature at the time of tilt setting. Or, a timer 62 (see FIG. 9) may be provided, and re-leveling or re-tilting reference plane can be set forcefully when a certain predetermined time has elapsed after the setting of the reference plane by giving due consideration on the factors such as influence of the vibration from outside.

Also, it may be so designed that the setting function of re-leveling or re-tilting reference plane can be carried out in ON-OFF manner.

Figure 11:
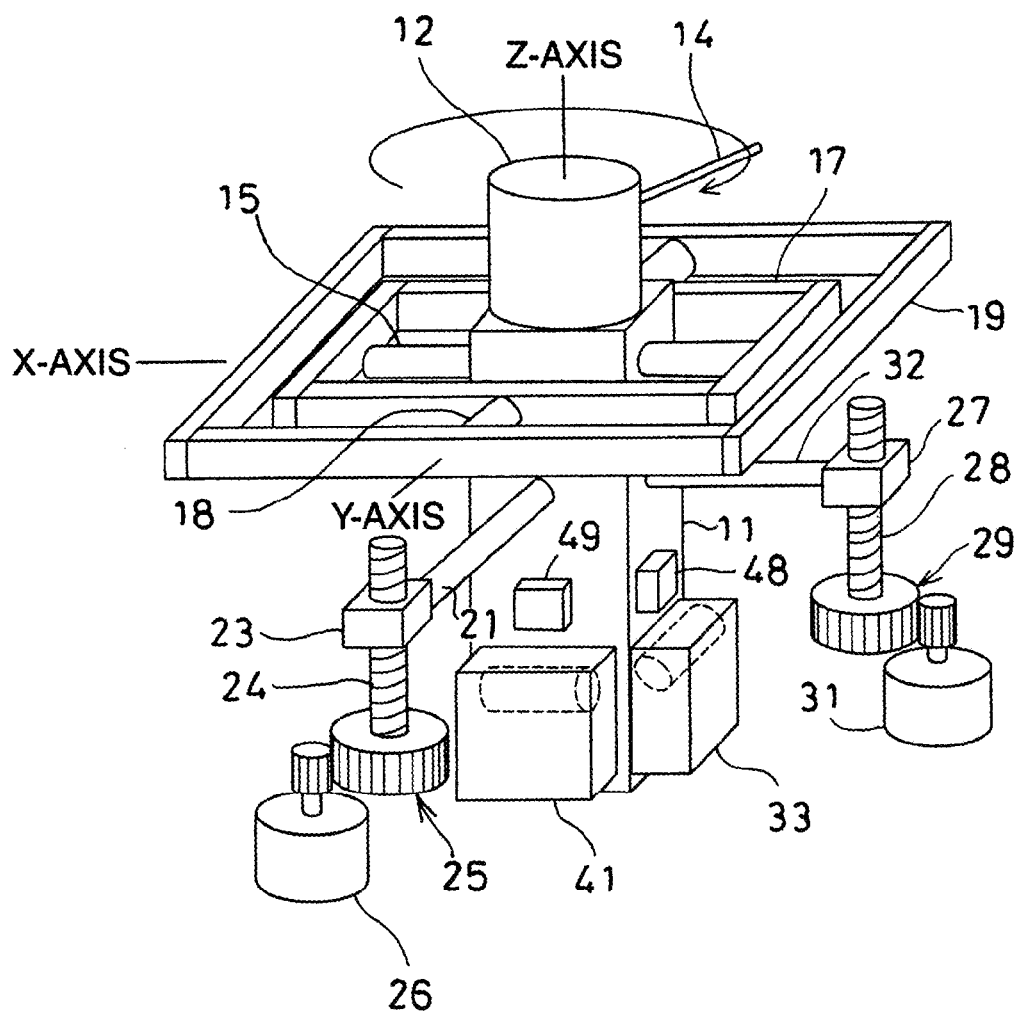
FIG. 11 is a perspective view to show an essential portion of a second embodiment of the laser surveying instrument provided with the tilt detecting device according to the present invention.

FIG. 11 shows a second embodiment of the laser surveying instrument according to the present invention. In FIG. 11, the same component as shown in FIG. 8 is referred by the same symbol, and detailed description is not given here.

In the laser surveying instrument of the second embodiment, a tilt setting mechanism is not used, and the mechanism is simplified.

Both of the X-axis tilt sensor 33 and the Y-axis tilt sensor 41 are disposed on the laser beam projector 11 so that the horizontality is detected when the laser beam projector 11 is at vertical position.

Similarly, the X-axis tilt angle detector 48 and the Y-axis tilt angle detector 49 are disposed in such manner that the horizontality is detected when the laser beam projector 11 is at vertical position.

The X-axis tilt angle detector 48 and the Y-axis tilt angle detector 49 are fixed on the X-axis tilt sensor 33 and the Y-axis tilt sensor 41 respectively via the laser beam projector 11. The X-axis tilt angle detector 48 and the Y-axis tilt angle detector 49 are relatively fixed on the X-axis tilt sensor 33 and the Y-axis tilt sensor 41 respectively and each of them is tilted integrally.

Now, description will be given on operation of the second embodiment.

First, description will be given on the laser surveying instrument as described above in case a horizontal reference plane is formed by the laser beam 14.

The X-axis leveling motor 26 and the Y-axis leveling motor 31 are driven so that both the X-axis tilt sensor 33 and the Y-axis tilt sensor 41 detect the horizontality respectively. When the X-axis tilt sensor 33 and the Y-axis tilt sensor 41 detect the horizontality respectively, the centerline of the laser beam projector 11 is running in vertical direction, and the laser beam 14 projected from the rotator 12 runs in horizontal direction. When the rotator 12 is rotated at a constant velocity, the laser beam 14 is projected in rotary irradiation within the horizontal plane, and a horizontal reference plane is formed.

Next, description will be given on a case where a tilted reference plane is formed. To simplify and facilitate the explanation, description will be given here on tilt setting in rotating direction around the second support shaft 18.

The Y-axis leveling motor 31 is driven by an amount of rotation to correspond to a preset tilt angle, and the laser beam projector 11 is tilted around the second support shaft 18 as a center. The tilting of the laser beam projector 11 is detected by the Y-axis tilt angle detector 49. In case the tilt angle actually detected is not consistent with the preset tilt angle, the Y-axis leveling motor 31 is driven further, and deviation is corrected.

When the deviation is corrected, the laser beam projector 11 is set to a tilt angle as desired.

By rotating the rotator 12 and by projecting the laser beam 14 in rotary irradiation, a tilted reference plane can be formed.

With respect to the tilting in the rotating direction around the first support shaft 15, by operating the X-axis tilt sensor 33, the X-axis tilt detector 48 and the X-axis leveling motor 26, the setting can be made in similar manner. By synthesizing the tilting relating to the second support shaft (Y-axis) 18 with the tilting of the first support shaft (X-axis) 15, the tilting of the reference plane can be set in the arbitrary direction and at the arbitrary angle.

INDUSTRIAL APPLICABILITY

The present invention provides a tilt detecting device, comprising a first tilt sensor for detecting a tilting with respect to direction of gravity with high accuracy, a second tilt sensor for detecting the tilting with respect to direction of gravity and for detecting the tilting with lower accuracy than that of the first tilt sensor and in a range wider than that of the first tilt sensor, wherein the first tilt sensor and the second tilt sensor are fixed relatively to each other, and the tilting is detected by the second tilt sensor by using a reference position and a detecting direction as detected by the first tilt sensor as reference. As a result, while the horizontality to be the reference value is detected at high accuracy, the manufacturing cost can be reduced by using a low-cost second tilt sensor.

Also, the invention provides the tilt detecting device as described above, wherein the second tilt sensor can be set in a plurality of small detection ranges where detection ranges of tilting are partially superimposed on or continuous to each other, and among the plurality of small detection ranges, a reference of a first small detection range is set by the first tilt sensor, and a reference of the second small detection range is a predetermined value obtained in the first small detection range superimposed on or continuous to the second small detection range. Further, the invention provides the tilt detecting device as described above, further comprising a third small detection range, and a reference in the third small detection range is a result of the detection detected in the second small detection range. As a result, it is possible to set the detection accuracy of the second tilt sensor by partially restricting the detection range of the second tilt sensor.

Also, the invention provides the tilt detecting device as described above, wherein the second tilt sensor can be set in a larger detection range, including all of tilt angle ranges detectable by the second tilt sensor, and a smaller detection range, which is a part of the larger detection range, and resolution of the smaller detection range is set to resolution higher than that of the larger detection range, and tilt detection in the smaller detection range is carried out based on the result of detection detected in the larger detection range as reference. As a result, the detection range of the second tilt sensor is partially restricted, and the resolution is set to higher within the restricted range. Thereby the resolution can be improved while the detection range is maintained in wide extent.

Further, the invention provides the tilt detecting device as described above, comprising a plurality of the first tilt sensors, the plurality of first tilt sensors are installed with tilting different from each other, and the second tilt sensor detects the tilting based on the reference position detected by one of the first tilt sensors. As a result, the results detected by the first tilt sensor for each predetermined tilt angle are used as reference. Thereby it is possible to detect the tilting with higher accuracy and in wider range.

Also, the invention provides the tilt detecting device as described above, wherein the second tilt sensor comprises a tilt displacement sensor, an amplifier for amplifying a detection signal from the tilt displacement sensor, a reference setter for setting a reference position on the amplifier, and a gain setter for setting gain of the amplifier, and wherein the reference can be offset according to the detected tilt angle, and a dynamic range of the amplifier is matched to the preset smaller detection range. As a result, the resolution of the second tilt sensor can be improved while maintaining the wide detection range without changing basic structure of the second tilt sensor.

Further, the invention provides the tilt detecting device as described above, wherein the first tilt sensor is a tilt sensor, and the second tilt sensor is an acceleration sensor. As a result, it is possible to reduce the manufacturing cost by using a low-cost acceleration sensor.

Also, the invention provides a laser surveying instrument, comprising a laser beam projector having a light source for emitting a laser beam and a rotator for projecting the laser beam in rotary irradiation, a drive unit for tilting the laser beam projector, and a tilt detecting device for detecting tilting of the laser beam projector, wherein the tilt detecting device has a first tilt sensor for detecting the tilting with respect to direction of gravity with high accuracy and a second tilt sensor being fixed relatively with the first tilt sensor, for detecting the tilting with respect to direction of gravity and for detecting the tilting in a range wider than that of the first tilt sensor at an accuracy lower than that of the first tilt sensor, and the tilting is detected by the second tilt sensor based on a reference position and the detection direction detected by the first tilt sensor as reference, and the tilting is set by the drive unit. As a result, it is possible to set the tilting of the reference plane in wider range.

The invention claimed is:

1. A tilt detecting device, comprising a first tilt sensor for detecting a tilting with respect to direction of gravity with high accuracy, a second tilt sensor for detecting the tilting with respect to direction of gravity and for detecting the tilting with lower accuracy than that of the first tilt sensor and in a range wider than that of the first tilt sensor, wherein said first tilt sensor and said second tilt sensor are fixed relatively to each other, and the tilting is detected by said second tilt sensor by using a reference position and a detecting direction as detected by the first tilt sensor as reference, wherein said second tilt sensor can be set in a plurality of small detection ranges where detection ranges of tilting are partially superimposed on or continuous to each other, and among said plurality of small detection ranges, a reference of a first small detection range is set by said first tilt sensor, and a reference of said second small detection range is a predetermined value obtained in said first small detection range superimposed on or continuous to said second small detection range.

2. A tilt detecting device, comprising a first tilt sensor for detecting a tilting with respect to direction of gravity with high accuracy, a second tilt sensor for detecting the tilting with respect to direction of gravity and for detecting the tilting with lower accuracy than that of the first tilt sensor and in a range wider than that of the first tilt sensor, wherein said first tilt sensor and said second tilt sensor are fixed relatively to each other, and the tilting is detected by said second tilt sensor by using a reference position and a detecting direction as detected by the first tilt sensor as reference, wherein said second tilt sensor can be set in a larger detection range, including all of tilt angle ranges detectable by said second tilt sensor, and a smaller detection range, which is a part of said larger detection range, and resolution of said smaller detection range is set to resolution higher than that of said larger detection range, and tilt detection in said smaller detection range is carried out based on the result of detection detected in said larger detection range as reference.

3. A tilt detecting device according to claim 1 or claim 2, wherein said second tilt sensor comprises a tilt displacement sensor, an amplifier for amplifying a detection signal from said tilt displacement sensor, a reference setter for setting a reference position on said amplifier, and a gain setter for setting gain of said amplifier, and wherein the reference can be offset according to the detected tilt angle, and a dynamic range of said amplifier is matched to said preset smaller detection range.

4. A tilt detecting device, comprising a plurality of first tilt sensors for detecting a tilting with respect to direction of gravity with high accuracy, a second tilt sensor for detecting the tilting with respect to direction of gravity and for detecting the tilting with lower accuracy than that of the first tilt sensors and in a range wider than that of the first tilt sensors, wherein said first tilt sensors and said second tilt sensor are fixed relatively to each other, and the tilting is detected by said second tilt sensor by using a reference position and a detecting direction as detected by the first tilt sensor as reference, wherein said plurality of first tilt sensors are installed with tilting different from each other, and said second tilt sensor detects the tilting based on the reference position detected by one of said first tilt sensors.

5. A tilt detecting device according to claim 1, further comprising a third small detection range, and a reference in said third small detection range is a result of the detection detected in said second small detection range.

6. A laser surveying instrument, comprising a laser beam projector having a light source for emitting a laser beam and a rotator for projecting said laser beam in rotary irradiation, a drive unit for tilting said laser beam projector, and a tilt detecting device for detecting tilting of said laser beam projector, wherein said tilt detecting device comprises the tilt detecting device according to one of claim 1, 5, 2 or 4, and the tilting is set by said drive unit based on the result of detection of said tilt detecting device.

7. A laser surveying instrument according to claim 6, wherein said tilt detecting device is tiltably mounted with respect to said laser beam projector, said detecting device is set to a predetermined tilting based on the result of detection by said second tilt sensor from a condition where said first tilt sensor detects the horizontality, and said laser beam projector is tilted so that said first tilt sensor detects the horizontality by said driving unit, and the tilting is set.

8. A laser surveying instrument according to claim 6, wherein said first tilt sensor and said second tilt sensor are installed on said laser beam projector, and said first tilt sensor and said second tilt sensor are fixed relatively to each other via said laser beam projector, and said laser beam projector is tilted based on the result of detection of said second tilt sensor from the condition where said first tilt sensor detects horizontality, and the tilting is set.

9. A tilt detecting device according to one of claim 1, 2 or 4, wherein said first tilt sensor is a tilt sensor, and said second tilt sensor is an acceleration sensor.

* * * * *